Figure 1:
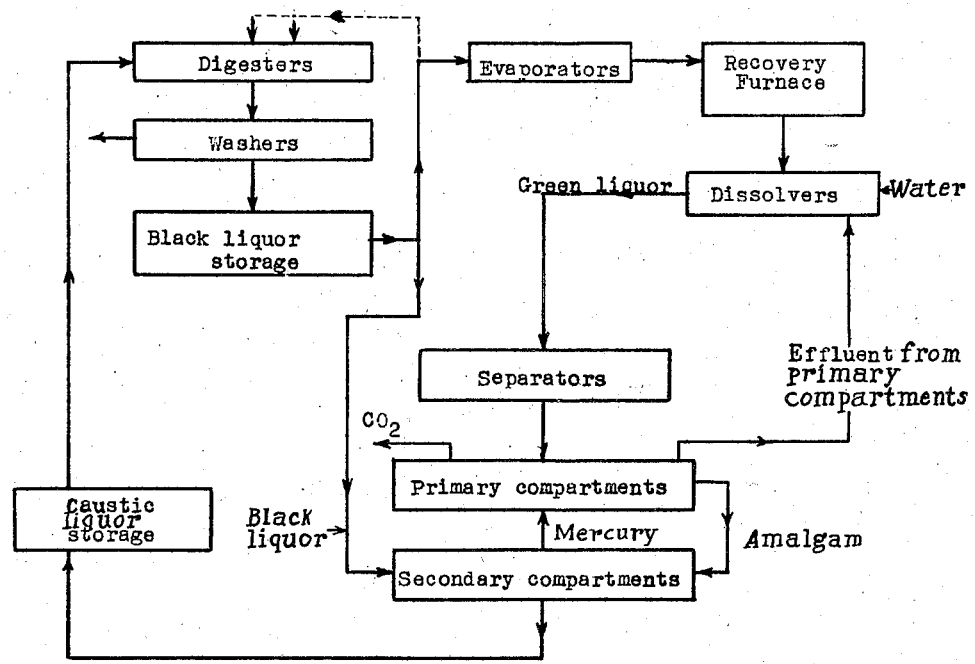

Feb. 25, 1947.                H. B. SOMERSET                    2,416,413
        ELECTROLYTIC TREATMENT OF ALKALINE PROCESS COOKING LIQUORS
                         Filed April 1, 1944        2 Sheets-Sheet 1

Inventor;
Henry B. Somerset

Patented Feb. 25, 1947

2,416,413

UNITED STATES PATENT OFFICE 2,416,413

ELECTROLYTIC TREATMENT OF ALKALINE PROCESS COOKING LIQUORS

Henry Beaufort Somerset, Burnie, Tasmania, Australia

Application April 1, 1944, Serial No. 529,133
In Australia April 27, 1943

7 Claims. (Cl. 204—99)

This invention relates to improvements in the causticisation of the "green liquor" produced in the alkaline processes of the manufacture of paper pulp.

By the terms "the alkaline process" and "the alkaline processes" for the production of paper pulp, it is to be understood as referring to those processes of paper pulp manufacture from cellulosic materials wherein the main reagent employed in the cooking liquor is caustic soda or sodium sulphide, and which include the "soda" and "sulphate" processes.

Economic operation of these processes necessitates the recovery of as much as possible of the alkali in the so-called "black liquor" which is discharged from the digesters at the conclusion of the cooking operation. This black liquor has a complex composition the important constituent of which is the sodium lignin compound or compounds produced during the cooking operation by reaction between the caustic soda in the liquor originally supplied to the digesters and the lignin content of the wood.

In order to recover the alkali content of this black liquor it is general practice to evaporate the liquor to about 60% solids for subsequent treatment. The concentrated liquor is then delivered to a suitable furnace in which the organic constituents are burnt, the alkali in the case of the "soda" process being converted to carbonate, and in the case of the sulphate process to carbonate and sulphide.

The product so obtained is dissolved in water forming green liquor. The term "green liquor" where used in this specification and accompanying claims, therefore, means the solution formed by the dissolution in water of the soluble constituents of the product obtained by the evaporation and subsequent incineration or smelting of black liquor produced in an alkaline process of paper pulp manufacture. Soda green liquor consists in effect of a solution of sodium carbonate, while sulphate green liquor consists of a solution of sodium carbonate and sodium sulphide with other soluble compounds regarded as impurities present to a minor degree. In either case the green liquor is causticised with burnt lime to produce caustic soda and calcium carbonate which latter precipitates as a sludge and is separated by filtration or other means.

The calcium carbonate may be reburnt for the recovery of burnt lime for re-use in the causticising process.

The aforesaid soda recovery processes are unpleasant to operate and the same is true in greater measure of the lime recovery process owing to the dusty atmosphere which unavoidably pervades the lime house.

Furthermore the said operations involve a substantial loss of alkali.

The general object of the present invention is to provide an improved method of producing caustic alkali from green liquor.

According to my invention I provide a method of treatment of green liquor produced in the alkaline process for the manufacture of paper pulp, which comprises delivering green liquor from dissolvers in which it is formed to the primary compartments of electrolytic cells of the mobile cathode type, electrolyzing the green liquor by a substantially continuous operation in the primary compartments, directing the effluent liquor from the primary compartments to the dissolvers to fortify the green liquor therein, returning the fortified green liquor to the primary compartments, delivering black liquor produced in the said alkaline process to the secondary compartments of the cells to regenerate caustic soda therein, and discharging regenerated caustic liquor from the secondary compartments.

Where in this specification and in the accompanying claims I refer to an electrolytic cell of the "mobile cathode" type I mean an electrolytic cell having a primary compartment and a secondary compartment, the cathode being formed of a fluent material (e. g. mercury) which circulates from the primary to the secondary compartment and back again, the cathodic product of electrolysis being transferred (e. g. as an amalgam) from the primary to the secondary compartment and the said product being separated from the mercury therein.

A salient feature of the invention resides in the control of cell conditions by the termination of electrolysis before denudation of the electrolyte has caused its resistance to rise above the desired limit.

The process of electrolysis can thus be discontinued when the required degree of causticisation is reached.

A further salient feature of the invention is the passage of the effluent from the primary compartment of the mobile cathode cell back to the dissolver (where sodium carbonate formed by the burning of the black liquor is normally dissolved in water) for the purpose of dissolving additional sodium carbonate therein, the fortified liquor then being returned to the primary compartment.

Another important feature of the invention resides in supplying black liquor to the secondary compartments of the electrolytic cells for regeneration of the sodium hydroxide therein, the regenerated caustic liquor being then returned to the digesters.

Prior to electrolysis the green liquor is preferably subjected to a settling or other suitable treatment for the removal of suspended solids in order to obviate fouling of the electrodes and/or of the diaphragm during the subsequent operation.

In the treatment of sulphate green liquor the gases discharged at the anode contain hydrogen sulphide which it is important to recover because the liquor supplied to the digesters must contain a suitable proportion of sodium sulphide in solution. Thus a further feature of the invention resides in recovering the hydrogen sulphide from the anodic products and in re-dissolving same in the caustic solution resulting from electrolysis.

Recovery of the hydrogen sulphide from the mixture of carbon dioxide and hydrogen sulphide liberated at the anode may be effected by physical or chemical means.

Alternatively, the carbon dioxide may be largely removed by passage of the mixed gases at a regulated rate through milk of lime or suspension of barium hydroxide in water.

Alternatively the gases may be liquefied under pressure and the hydrogen sulphide preferentially recovered by fractional distillation.

Other known methods of separation may be employed.

Figure 2:
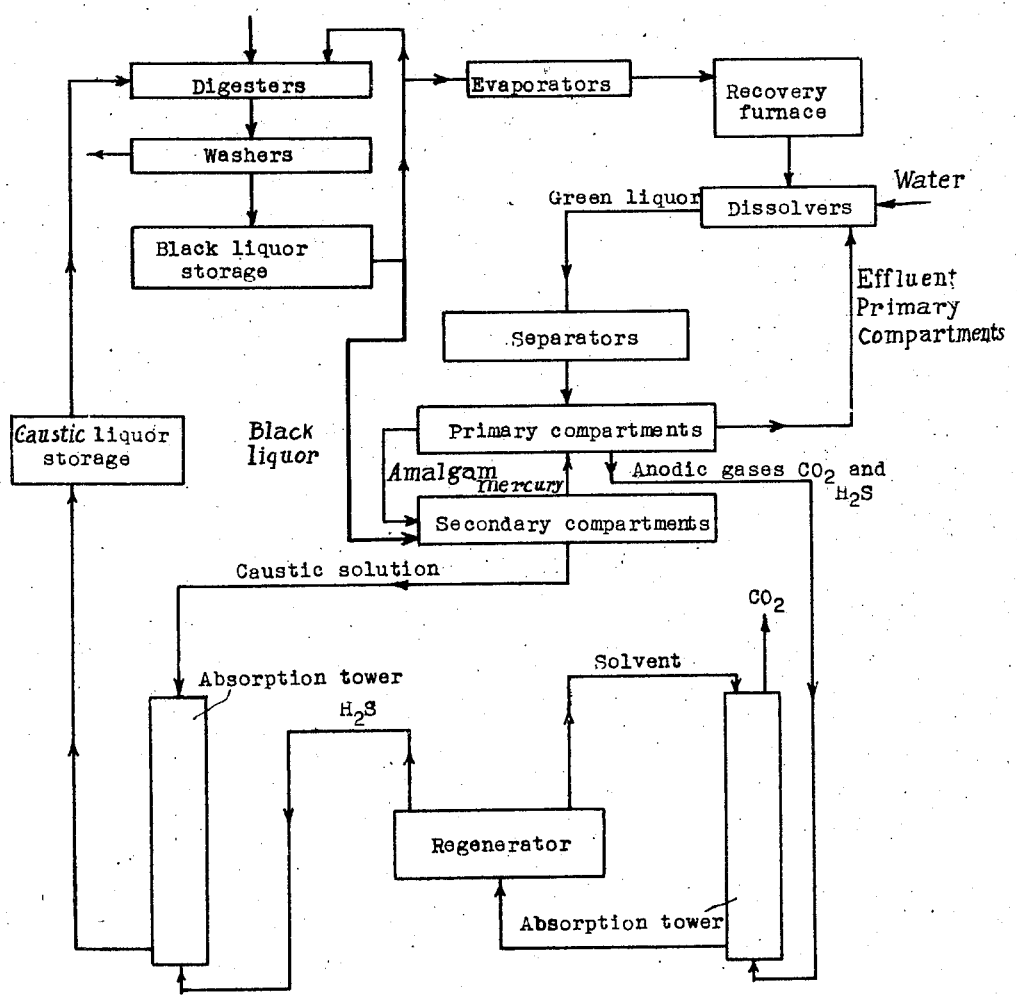

In the drawings:

Figure 1 is a flow sheet illustrating one form of the invention as applied to the treatment of soda green liquor; and Figure 2 is a flow sheet showing one form of the invention as applied to the treatment of sulphate green liquor.

Referring now to Fig. 1, black liquor discharged from the digesters in the soda pulping process is evaporated and then incinerated in a suitable furnace, the incinerated product then being passed to dissolvers where it is dissolved in water to form the green liquor.

The green liquor is then subjected to a settling or other treatment whereby the solid particles suspended therein are removed.

The clarified liquor is then continuously delivered to the primary compartments of mercury type electrolytic cells having anodes of any suitable type and is therein subjected to electrolysis whereby the sodium produced at the mercury cathode amalgamates therewith and is delivered thereby to the secondary compartments of the cells, while carbon dioxide is discharged at the anode and may, if desired, be recovered.

Electrolysis proceeds until the alkali content of the clarified solution is reduced to a suitable value which depends upon the degree of causticisation required in the regenerated liquor and/or upon the maintenance of an economic resistance in the primary compartments. The partially denuded electrolyte or effluent from the primary compartments is directed to the dissolvers in which dissolution of the incinerated black liquor is effected, and the amalgam from the primary compartments passes direct to the secondary compartments of the cells where the sodium in the amalgam is regenerated and passes into solution as caustic soda. By this means, and by regulation of the rate of flow of the green liquor through the primary cell, the resistance of the electrolyte in the primary cell may be reduced and the power consumption per ton of recovered caustic soda kept at a minimum level.

The whole or a portion of the black liquor normally returned to the digesters is delivered to the secondary compartments of the cells to regenerate the caustic soda. In this way, a considerable steam saving is effected in the evaporators as the total solids content of the black liquor is considerably higher than in the normal process. By this process, the quantity of water added to the system can be greatly reduced, thereby effecting a very substantial economy in paper pulp manufacture.

These operations proceed continuously—that is to say, clarified green liquor is delivered continuously to the primary compartments of the cells and liquor containing a suitable proportion of caustic alkali in solution passes continuously from the secondary compartments of the cell.

This discharged liquid is delivered to the digesters for subsequent use in the cooking treatment of the cellulosic material.

A feature of the invention resides in restricting the percentage recovery of alkali in the electrolytic cell to avoid undesirable increase in cell resistance as the operation proceeds—with resultant operating economies.

Likewise, the clarification of the green liquor prior to electrolysis obviates or minimises difficulties due to fouling of the electrodes.

Referring to Fig. 2, which illustrates the application of this invention to the sulphate pulping process, the green liquor is produced in a similar manner to that shown in Fig. 1, and is then passed to the primary compartments of electrolytic cells of the mercury cathode type. The effluent from the primary compartments is returned to the dissolvers and the caustic soda is regenerated in the secondary compartments by means of black liquor discharged from the digesters. The regenerated cooking liquor discharged from the secondary compartments is returned to the digesters, preferably after passing through an absorption tower as below described.

As stated previously the gases liberated at the anode during electrolysis of sulphate green liquor contain hydrogen sulphide. As the cooking liquor used in the sulphate process must contain sodium sulphide in addition to caustic soda, it is necessary for economic reasons for the hydrogen sulphide to be recovered from the effluent gases and reabsorbed in the caustic soda solution obtained from the cell.

This is preferably accomplished by the absorption of the hydrogen sulphide in a selective solvent from which it can readily be regenerated by heat or other means, the operation being carried out in an absorption tower or other unit of known type. The hydrogen sulphide regenerated from the solvent may be subjected to further purification or may be immediately reabsorbed in the caustic liquor from the cells by means of a similar type of absorption apparatus, the denuded solvent being returned for re-use in recovering further hydrogen sulphide from the gases evolved at the anode.

The caustic liquor, now containing caustic soda and sodium sulphide in the requisite proportions, is returned to the digesters for subsequent use in the cooking treatment of wood.

As a specific example of the invention, the following can be quoted:

Example A

Using a mercury type cell with carbon anodes and a feed liquor prepared by dissolving soda ash in water to give a solution carrying 305 grams per litre of sodium carbonate and then settling to remove impurities, I obtained an effluent from the primary compartment of the cell carrying 137.5 grams per litre of sodium carbonate.

Further soda ash was dissolved in this effluent to bring it back to the original strength of 305 grams per litre and, after settling, the liquor was returned to the primary compartment of the cell.

Black liquor containing 160 grams per litre of total solids was used to regenerate the caustic soda from the amalgam in the secondary compartment of the cell and the effluent liquor from this compartment carried 55 grams per litre of free caustic soda in addition to the solids originally present.

This liquor is suitable for use in the digesters.

The voltage on the primary compartment of the cell was 5.0 volts and the current efficiency in respect of soda was 94.1%.

By means of the present invention, a considerable improvement is effected in the economic recovery of alkali from "green liquor" and the existing operations of causticisation with lime and of subsequent reburning of the lime with their attendant disadvantages, are eliminated. It is important in this connection to recall that, notwithstanding the tremendous amount of research and investigation carried out in this large industry through the world, the present normal operations have long been standard practice although the specified disadvantages are quite well known.

I claim:

1. A method of treatment of green liquor and black liquor produced in the alkaline process for the manufacture of paper pulp, which comprises delivering green liquor from dissolvers in which it is formed to the primary compartments of electrolytic cells having primary and secondary compartments, an anode and a mercury cathode, electrolyzing the green liquor by a substantially continuous operation in the primary compartments between the anode and the mercury cathode to extract sodium in the form of sodium amalgam, directing the effluent liquor from the primary compartments to the dissolvers to fortify the green liquor therein, returning the fortified green liquor to the primary compartments, delivering black liquor produced in the said alkaline process to the secondary compartments of the cells and contacting it therein with the sodium amalgam to regenerate caustic soda therein, and discharging regenerated caustic liquor from the secondary compartments.

2. A method of treatment of green liquor and black liquor produced in the alkaline process for the manufacture of paper pulp, which comprises delivering green liquor from dissolvers in which it is formed to the primary compartments of electrolytic cells of the mercury cathode type having primary and secondary compartments, and an anode, electrolyzing the green liquor substantially continuously in the primary compartments to extract sodium in the form of sodium amalgam, passing sodium amalgam from the primary compartments to the secondary compartments, directing the effluent liquor from the primary compartments to the dissolvers to fortify the green liquor therein, returning the fortified green liquor to the primary compartments, delivering black liquor produced in the said alkaline process to the secondary compartments of the cells and contacting it with the sodium amalgam in order to regenerate caustic soda therein and to remove the sodium from the amalgam, returning mercury from the secondary to the primary compartments, and discharging regenerated caustic liquor from the secondary compartments.

3. A method of treatment of green liquor and black liquor produced in the alkaline process for the manufacture of paper pulp, which comprises delivering green liquor from dissolvers in which it is formed to the primary compartments of electrolytic cells having primary and secondary compartments, an anode and a mercury cathode, electrolyzing the green liquor in the primary compartments to extract sodium in the form of sodium amalgam to a stage at which the sodium carbonate in the green liquor is only partially converted and an undue rise in cell resistance is thereby prevented, directing the effluent from the primary compartments to the dissolvers to fortify the green liquor therein, returning the fortified green liquor to the primary compartments, delivering black liquor produced in the said alkaline process to the secondary compartments of the cells and contacting it with sodium amalgam transferred thereto from the primary compartment to regenerate caustic soda therein, and discharging regenerated caustic liquor from the secondary compartments.

4. A method according to claim 1 wherein carbon dioxide liberated at the anode is recovered.

5. In the treatment of black liquor discharged from the digesters in the alkaline process for the manufacture of paper pulp, concentrating and then incinerating the black liquor, directing the incinerated product into dissolvers in which its soluble constituents are dissolved in water to form green liquor, electrolyzing the green liquor between an anode and a mercury cathode to extract sodium in the form of sodium amalgam, replenishing the sodium content of black liquor by contacting it with the sodium amalgam and recycling the so treated green liquor to the dissolvers.

6. A method according to claim 5 wherein solid impurities are separated from the green liquor before it is delivered to the electrolytic cells.

7. A method of treatment of green liquor and black liquor produced in the sulphate process for the manufacture of paper pulp, which comprises delivering green liquor from dissolvers in which it is formed to the primary compartments of electrolytic cells having primary and secondary compartments, anodes and mercury cathodes, electrolyzing the green liquor by a substantially continuous operation in the primary compartments to extract sodium in the form of sodium amalgam, directing the effluent liquor from the primary compartments to the dissolvers to fortify the green liquor therein, returning the fortified green liquor to the primary compartments, delivering black liquor produced in the said sulphate process to the secondary compartments of the cells and contacting it with sodium amalgam transferred thereto from the primary compartment to regenerate caustic soda therein, discharging regenerated caustic liquor from the secondary compartments, treating the gases liberated at the anode to separate hydrogen sulphide and absorbing the hydrogen sulphide in the regenerated caustic liquor for reuse in the sulphate process.

HENRY BEAUFORT SOMERSET.

REFERENCES CITED

The following references are of record in the file of this patent:

UNITED STATES PATENTS

| Number | Name | Date |
|---|---|---|
| 2,317,600 | Benedict | Apr. 27, 1943 |
| 2,172,415 | Stewart | Sept. 12, 1939 |
| 2,093,770 | Billiter | Sept. 21, 1937 |
| 1,062,016 | Langlet | May 20, 1913 |
| 2,354,553 | Sherk | July 25, 1944 |

FOREIGN PATENTS

| Number | Country | Date |
|---|---|---|
| 500,454 | French | Dec. 17, 1919 |
| 350,428 | German | Mar. 18, 1922 |
| 319,068 | German | Feb. 14, 1920 |
| 286,622 | British | June 5, 1929 |

OTHER REFERENCES

Manufacture of Pulp and Paper, volume III, published by McGraw-Hill Book Company, 3rd edition (1937) section 5, pages 140–141.